(12) United States Patent
Ophey et al.

(10) Patent No.: US 10,036,275 B2
(45) Date of Patent: Jul. 31, 2018

(54) METHOD FOR TESTING AN OVERSPEED PROTECTION APPARATUS OF A SINGLE-SHAFT SYSTEM

(71) Applicant: Siemens Aktiengesellschaft, Munich (DE)

(72) Inventors: Martin Ophey, Straelen (DE); Martin Bennauer, Bottrop (DE); Thorsten Engler, Moers (DE); Susanne Haas, Mulheim an der Ruhr (DE); Andreas Pahl, Dusseldorf (DE); Marian-Peter Pieczyk, Dusseldorf (DE); Martin Stapper, Kamp-Lintfort (DE); David Veltmann, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 14/916,378

(22) PCT Filed: Sep. 8, 2014

(86) PCT No.: PCT/EP2014/069066
§ 371 (c)(1),
(2) Date: Mar. 3, 2016

(87) PCT Pub. No.: WO2015/039906
PCT Pub. Date: Mar. 26, 2015

(65) Prior Publication Data
US 2016/0201501 A1    Jul. 14, 2016

(30) Foreign Application Priority Data
Sep. 17, 2013   (EP) ..................................... 13184819

(51) Int. Cl.
*F01D 21/02*   (2006.01)
*F01D 21/20*   (2006.01)
(Continued)

(52) U.S. Cl.
CPC ............... *F01D 21/02* (2013.01); *F01D 5/02* (2013.01); *F01D 15/10* (2013.01); *F01D 15/12* (2013.01);
(Continued)

(58) Field of Classification Search
None
See application file for complete search history.

(56) References Cited

U.S. PATENT DOCUMENTS 3,643,437 A * 2/1972 Birnbaum ............... F01D 21/02
290/2
5,199,256 A   4/1993 Moore
(Continued)

FOREIGN PATENT DOCUMENTS

EP   2372108 A2   10/2011
EP   2458180 A1    5/2012
(Continued)

OTHER PUBLICATIONS

JP Office Action dated Mar. 27, 2917, for JP patent application No. 2016-543358.
(Continued)

*Primary Examiner* — Jill Culler
*Assistant Examiner* — Ruben Parco, Jr.
(74) *Attorney, Agent, or Firm* — Beusse Wolter Sanks & Maire

(57) ABSTRACT

A method for testing an overspeed protection apparatus of a single-shaft system that includes: a) operating the system at nominal speed and under electrical load, wherein the load is selected to be low enough that, after dropping the load, the speed of the system rises such that the speed remains below steam turbine threshold speed lower than gas turbine threshold speed, such that first overspeed protection is triggered when the speed of the steam turbine reaches the steam
(Continued)

turbine threshold speed, and second overspeed protection is triggered when the speed of the gas turbine reaches the gas turbine threshold speed; b) dropping the load; c) increasing the mass flow of the steam introduced into the steam turbine and/or of the fuel introduced into the gas turbine such that the speed of the steam turbine reaches the steam turbine threshold speed; d) testing whether the first overspeed protection is triggered.

4 Claims, 1 Drawing Sheet

(51) Int. Cl.
*F01D 5/02* (2006.01)
*F01D 15/10* (2006.01)
*F01D 15/12* (2006.01)
*F01K 23/12* (2006.01)
*G01M 15/14* (2006.01)
*F01D 21/00* (2006.01)

(52) U.S. Cl.
CPC ............ *F01D 21/003* (2013.01); *F01K 23/12* (2013.01); *G01M 15/14* (2013.01); *F05D 2220/31* (2013.01); *F05D 2220/32* (2013.01); *F05D 2220/76* (2013.01); *F05D 2240/60* (2013.01); *F05D 2260/83* (2013.01)

(56) References Cited

U.S. PATENT DOCUMENTS

| 2011/0232259 | A1 | 9/2011 | Block et al. |
| 2011/0238358 | A1* | 9/2011 | Block ............... F01K 23/16 |
| | | | 702/113 |
| 2014/0060066 | A1 | 3/2014 | Hesse |

FOREIGN PATENT DOCUMENTS

| EP | 1503047 | B1 | | 9/2016 |
| JP | 2005054583 | A | | 3/2005 |
| JP | 2011197006 | A | | 10/2011 |
| JP | 2015038357 | A | * | 2/2015 |
| RU | 2376487 | C2 | | 12/2009 |
| RU | 2431051 | C1 | | 10/2011 |
| RU | 2431753 | C1 | | 10/2011 |

OTHER PUBLICATIONS

KR Office Action dated Jul. 31, 2017, for KR patent application No. 1020167006629.

* cited by examiner

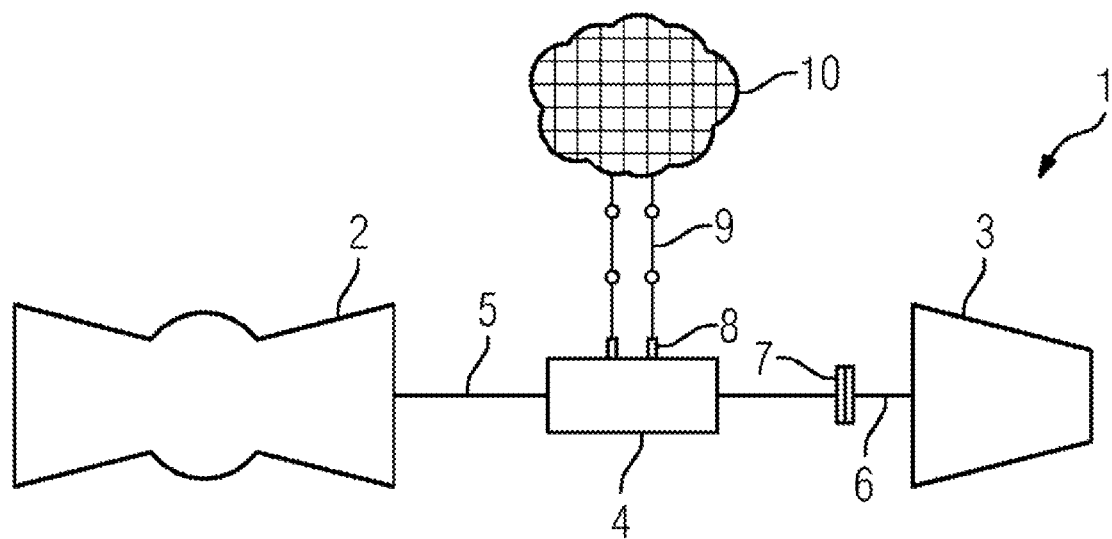

METHOD FOR TESTING AN OVERSPEED PROTECTION APPARATUS OF A SINGLE-SHAFT SYSTEM

CROSS REFERENCE TO RELATED APPLICATIONS

This application is the US National Stage of International Application No. PCT/EP2014/069066 filed Sep. 8, 2014, and claims the benefit thereof. The International Application claims the benefit of European Application No. EP13184819 filed Sep. 17, 2013. All of the applications are incorporated by reference herein in their entirety.

FIELD OF INVENTION

The invention relates to a method for testing an overspeed protection apparatus of a single-shaft system.

BACKGROUND OF INVENTION

In a single-shaft system for generating electrical energy, a gas turbine, a steam turbine and a generator are arranged on a common train. During normal operation of the single-shaft system, the electrical energy is fed into an electrical grid and the train rotates at a speed which corresponds to the rated speed of the single-shaft system, for example 50 Hz or 60 Hz. In the event of a fault, in particular in the event of a drop in the electric load connected to the generator, the speed can rise to values above the rated speed. If the speed reaches a critical speed, the single-shaft system is subjected to excessive mechanical and thermal load, resulting in a reduction in the service life of the single-shaft system.

When a limit speed is reached, an overspeed protection apparatus, which prevents a further rise in the speed of the train, engages, wherein the limit speed is conventionally chosen so as to lie between the rated speed and the critical speed. Conventionally, the overspeed protection apparatus is tested by operating the single-shaft system in test operation, in which the limit speed is reduced with respect to the limit speed in normal operation, in order to thus avoid excessive load on the single-shaft system during test operation.

However, it would be desirable to use, in test operation, the same limit speed as in normal operation. In addition, such a test is compulsory in certain countries, for example in South Korea.

SUMMARY OF INVENTION

The invention has the object of providing a method for testing an overspeed protection apparatus of a single-shaft system, wherein the method does not lead to excessive load on the single-shaft system.

The method according to the invention for testing an overspeed protection apparatus of a single-shaft system having a gas turbine, a generator and a steam turbine has the steps of: a) operating the single-shaft system at its rated speed and under an electric load connected to the generator, wherein the load is chosen to be low such that, after the load is shed, the speed of the single-shaft system rises such that the speed remains below a steam turbine limit speed which is lower than a gas turbine limit speed, wherein the overspeed protection apparatus is set up such that a first overspeed protection is triggered as soon as the speed of the steam turbine reaches the steam turbine limit speed, and a second overspeed protection is triggered as soon as the speed of the gas turbine reaches the gas turbine limit speed; b) shedding the load; c) raising the mass flow of the steam fed into the steam turbine and/or of the fuel fed into the gas turbine such that the speed of the steam turbine reaches the steam turbine limit speed; d) checking whether the first overspeed protection is triggered.

By virtue of the fact that the steam turbine limit speed is achieved by raising the mass flow of fuel and/or of steam, and not for example by shedding the load, the steam turbine limit speed can advantageously be approached slowly and a critical speed of the single-shaft system can advantageously be avoided. It is thus possible to avoid excessive mechanical and thermal load on the single-shaft system during testing of the overspeed protection apparatus, and as a consequence the single-shaft system has a long service life. With the method according to the invention, the excessive load can be avoided even if the limit speeds used for the gas turbine limit speed and for the steam turbine limit speed are the same, as in normal operation of the single-shaft system.

The steam turbine is advantageously coupled to the single-shaft system by means of a clutch, wherein the clutch engages as soon as the steam turbine overtakes the gas turbine and disengages when the speed of the steam turbine is lower than that of the gas turbine, wherein step c) is carried out such that the steam turbine is accelerated faster than the gas turbine, such that the clutch remains engaged. In the event that the mass moment of inertia of the gas turbine is smaller than the mass moment of inertia of the steam turbine, the gas turbine accelerates faster than the steam turbine after load shedding, which can lead to the clutch disengaging. By virtue of the fact that the clutch remains engaged, the gas turbine and the steam turbine rotate at the same speed while the steam turbine accelerates to its steam turbine limit, whereby it is advantageously ensured that, in so doing, the speed of the gas turbine does not reach a critical speed.

The method advantageously has the step of: e) interrupting the mass flow of the steam fed into the steam turbine in the event that the first overspeed protection is triggered. Interrupting the mass flow of the steam will lead to the clutch disengaging and thus the steam turbine rotates independently of the gas turbine and of the generator.

Advantageously, the method has the steps of: f) raising the mass flow of the fuel such that the speed of the gas turbine reaches the gas turbine limit speed; g) checking whether the second overspeed protection is triggered. By virtue of the fact that the gas turbine limit speed is higher than the steam turbine limit speed, it is possible to test the second overspeed protection after testing the first overspeed protection and independently of this testing.

The method according to the invention will be explained in more detail below, with reference to the appended schematic drawing.

BRIEF DESCRIPTION OF THE DRAWINGS

The FIGURE shows a schematic view of a single-shaft system.

DETAILED DESCRIPTION OF INVENTION

As shown in the FIGURE, a single-shaft system 1 has a gas turbine 2, a steam turbine 3 and an electric generator 4. The gas turbine 2 and the steam turbine 4 serve for generating rotational energy, the rotational energy being converted into electrical energy in the generator 4. The generator 4 is arranged between the gas turbine 2 and the steam turbine 3. The gas turbine 2 has a gas turbine shaft 5 and the steam turbine 3 has a steam turbine shaft 6. The FIGURE shows that the generator 4 and the gas turbine 2 are arranged together on the gas turbine shaft 5. It is however also conceivable that the generator 4 is provided with a separate generator shaft which is coupled to the gas turbine shaft 5 by means of a clutch.

The steam turbine shaft 6 is connected to the gas turbine shaft 5 by means of a clutch 7. The clutch 7 is set up such that it engages if the steam turbine 3 overtakes the gas turbine 2, meaning that the speed of the steam turbine 3 is higher than the speed of the gas turbine 2. Once the clutch 7 is engaged, the gas turbine 2 and the steam turbine 3 rotate at the same speed. The clutch 7 is further set up so as to disengage if the steam turbine 3 rotates more slowly than the gas turbine 2. The clutch 7 can for example be an SSS clutch.

When starting up the single-shaft system 1, the gas turbine 2 is accelerated first, the clutch 7 being disengaged. Then, an electric consumer 10 is connected to an electrical connection 8 of the generator 4 by closing a switch 9. The waste heat of the gas turbine 2 is used to generate steam and thus to drive the steam turbine 3. Once the steam turbine 3 has also been accelerated, the clutch 7 engages. The current consumption of the consumer 10 corresponds to an electric load connected to the generator 4. Now, if the load connected to the generator 4 drops without the mass flows of the steam fed into the steam turbine 3 and/or of the fuel fed into the gas turbine 2 being reduced, this leads to a rise in the speed of the single-shaft system 1.

In order to avoid the speed of the single-shaft system 1 rising to a critical value, the single-shaft system 1 has an overspeed protection apparatus. In that context, the overspeed protection apparatus is set up such that a first overspeed protection is triggered as soon as the speed of the steam turbine 3 reaches a steam turbine limit speed, and a second overspeed protection is triggered as soon as the speed of the gas turbine 2 reaches a gas turbine limit speed. When the first overspeed protection is triggered, for example the mass flow of the steam can be interrupted. When the second overspeed protection is triggered, the mass flow of the fuel can also be interrupted.

The method according to the invention will be explained in greater detail below with reference to an example.

The exemplary method for testing an overspeed protection apparatus of a single-shaft system 1 having a gas turbine 2, a generator 4 and a steam turbine 3, wherein the steam turbine 2 is coupled to the single-shaft system 1 by means of a clutch 7, wherein the clutch 7 engages as soon as the steam turbine 3 overtakes the gas turbine 2 and disengages when the speed of the steam turbine 3 is lower than that of the gas turbine 2, is to be carried out with the steps of: a) operating the single-shaft system 1 at its rated speed and under an electric load connected to the generator 4, wherein the load is chosen to be low such that, after the load is shed, the speed of the single-shaft system 1 rises such that the speed remains below a steam turbine limit speed which is lower than a gas turbine limit speed, wherein the overspeed protection apparatus is set up such that a first overspeed protection is triggered as soon as the speed of the steam turbine 3 reaches the steam turbine limit speed, and a second overspeed protection is triggered as soon as the speed of the gas turbine 2 reaches the gas turbine limit speed; b) shedding the load; c) raising the mass flow of the steam fed into the steam turbine 3 and/or of the fuel fed into the gas turbine 2 such that the speed of the steam turbine 3 reaches the steam turbine limit speed, wherein the steam turbine 3 is accelerated faster than the gas turbine 2, such that the clutch 7 remains engaged; d) checking whether the first overspeed protection is triggered; e) interrupting the mass flow of the steam fed into the steam turbine 3 in the event that the first overspeed protection is triggered; f) raising the mass flow of the fuel such that the speed of the gas turbine 2 reaches the gas turbine limit speed; g) checking whether the second overspeed protection is triggered.

In that context, the steam turbine limit speed can for example be 1066% to 108% of the rated speed and the gas turbine limit speed can be 0.1% to 0.5% greater than the steam turbine limit speed.

Although the invention has been described and illustrated in more detail by way of the preferred exemplary embodiment, the invention is not restricted by the disclosed examples and other variations can be derived herefrom by a person skilled in the art without departing from the scope of protection of the invention.

The invention claimed is:

1. A method for testing an overspeed protection apparatus of a single-shaft system having a gas turbine, a generator and a steam turbine, the method comprising:
   a) operating the single-shaft system at its rated speed and under an electric load connected to the generator, wherein the load is chosen such that a shedding of the load results in an increase of the speed of the single-shaft system but only to a speed that is below a steam turbine limit speed which is, in turn, lower than a gas turbine limit speed,
   wherein the overspeed protection apparatus is set up such that a first overspeed protection is triggered as soon as the speed of the steam turbine reaches the steam turbine limit speed, and a second overspeed protection is triggered as soon as the speed of the gas turbine reaches the gas turbine limit speed;
   b) shedding the load;
   c) raising a mass flow of steam fed into the steam turbine and/or a mass flow of fuel fed into the gas turbine after shedding the load and before first surpassing the steam turbine limit speed to increase the speed of the steam turbine to the steam turbine limit speed; and
   d) checking whether the first overspeed protection is triggered when the speed of the steam turbine reaches the steam turbine limit speed.

2. The method as claimed in claim 1,
   wherein the steam turbine is coupled to the single-shaft system by means of a clutch,
   wherein the clutch engages as soon as the steam turbine overtakes the gas turbine and disengages when the speed of the steam turbine is lower than that of the gas turbine,
   wherein step c) is carried out such that the steam turbine is accelerated faster than the gas turbine, such that the clutch remains engaged until the speed of the steam turbine reaches the steam turbine limit speed.

3. The method as claimed in claim 2, further comprising:
   e) interrupting the mass flow of the steam fed into the steam turbine once the first overspeed protection is triggered, effective to disengage the clutch and permit the gas turbine to rotate independently of the steam turbine.

4. The method as claimed in claim 3, further comprising:
   f) raising the mass flow of the fuel after interrupting the mass flow of the steam into the steam turbine and with the clutch disengaged to increase the speed of the gas turbine to the gas turbine limit speed; and g) checking whether the second overspeed protection is triggered when the speed of the gas turbine reaches the gas turbine limit speed.

* * * * *